US009164761B2

(12) United States Patent
Tsai et al.

(10) Patent No.: US 9,164,761 B2
(45) Date of Patent: Oct. 20, 2015

(54) OBTAINING DATA IN A PIPELINED PROCESSOR

(75) Inventors: Aaron Tsai, Poughkeepsie, NY (US); Bruce C. Giamei, Poughkeepsie, NY (US); Chung-Lung Kevin Shum, Wappingers Falls, NY (US); Scott B. Swaney, Germantown, NY (US)

(73) Assignee: International Business Machines Corporation, Armonk, NY (US)

( * ) Notice: Subject to any disclaimer, the term of this patent is extended or adjusted under 35 U.S.C. 154(b) by 1762 days.

(21) Appl. No.: 12/033,351

(22) Filed: Feb. 19, 2008

(65) Prior Publication Data

US 2009/0210651 A1    Aug. 20, 2009

(51) Int. Cl.
| G06F 7/38 | (2006.01) |
| G06F 9/00 | (2006.01) |
| G06F 9/44 | (2006.01) |
| G06F 15/00 | (2006.01) |
| G06F 9/30 | (2006.01) |
| G06F 9/38 | (2006.01) |

(52) U.S. Cl.
CPC ........ *G06F 9/30032* (2013.01); *G06F 9/30101* (2013.01); *G06F 9/3879* (2013.01)

(58) Field of Classification Search
USPC ....................................................... 712/225
See application file for complete search history.

(56) References Cited

U.S. PATENT DOCUMENTS

| 5,625,808 A | 4/1997 | Webb et al. |
| 5,680,598 A | 10/1997 | Farrell et al. |
| 5,694,587 A | 12/1997 | Webb et al. |
| 6,671,793 B1 | 12/2003 | Swaney et al. |
| 6,938,148 B2 | 8/2005 | Moore et al. |
| 7,082,517 B2 | 7/2006 | Busaba et al. |

OTHER PUBLICATIONS

Barat, Francisco, et al. "Software Pipelining for Coarse-Grained Reconfigurable Instruction Set Processors". IEEE Computer Society, Proceedings of the 15th International Conference of VLSI Design. Mar. 2002. 7 pages.
"IBM® z/Architecture Principles of Operation", Publication No. SA22-7832-05, 6th Edition, Apr. 2007_1,215 pages separated into 4 electronic attachments.
(Continued)

*Primary Examiner* — Corey S Faherty
(74) *Attorney, Agent, or Firm* — Cantor Colburn LLP; Margaret McNamara

(57) ABSTRACT

A pipelined processor including one or more units having storage locations not directly accessible by software instructions. The processor includes a load-store unit (LSU) in direct communication with the one or more units for accessing the storage locations in response to special instructions. The processor also includes a requesting unit for receiving a special instruction from a requestor and a mechanism for performing a method. The method includes broadcasting storage location information from the special instruction to one or more of the units to determine a corresponding unit having the storage location specified by the special instruction. Execution of the special instruction is initiated at the corresponding unit. If the unit executing the special instruction is not the LSU, the data is sent to the LSU. The data is received from the LSU as a result of the execution of the special instruction. The data is provided to the requester.

14 Claims, 5 Drawing Sheets

(56) References Cited

OTHER PUBLICATIONS

Lodi, Andrea, et al. "A Pipelined Configurable Gate Array for Embedded Processors". FPGA, Monterey, California. Feb. 23-25, 2003. pp. 21-30.

Postiff, Matthew, et al. "Integrating Superscalar Processor Components to Implement Register Caching". ICS, 2001, Sorrento, Italy. Jan. 6, 2001. pp. 348-357.

Seznec, Andre', et al. "Register Write Specialization Register Read Specialization: A Path to Complexity-Effective Wide-Issue Superscalar Processors". IEEE, Jan. 2002. pp. 383-394.

READ SPECIAL PERVASIVE REGISTER

RSPR     R$_1$, REG,     RUI         [RI]

| 'A3' | R1 | 'F' | I2 |
|---|---|---|---|
| 0 | 8 | 12 | 16                  31 |

FIG. 3

OBTAINING DATA IN A PIPELINED PROCESSOR

BACKGROUND OF THE INVENTION

This invention relates generally to a pipelined processor, and more particularly to obtaining data in a pipelined processor.

High performance processors are typically pipelined. Pipelining is a method of processing that allows for fast concurrent processing of data. This is accomplished by overlapping operations by using multiple stages of processes where information is passed from one process to another process. Most processor instructions have to go through the same basic sequence: the instruction must be fetched, it must be executed, and its results must be stored. The pipelining method fetches and decodes instructions in which, at any given time, several program instructions are in various stages of being fetched or decoded. Pipelining improves the speed of system execution time by ensuring that the microprocessor does not have to wait for the previous instruction to complete before beginning work on the next instruction. When the processor completes execution of one instruction, the next instruction is ready to be performed.

Some software instructions in certain instruction set architectures are too complicated to be executed by simply flowing through the logic in the central processor. Some of these complicated instructions are broken down into "sub-programs" which use multiple, existing simpler instructions to perform the complicated function that the instruction is designed to perform. One form of these "sub-programs" is known as millicode. Millicode is similar to vertical micro code. In general, millicode instructions may utilize storage locations and special instructions that are not available to the higher level instructions.

BRIEF SUMMARY OF THE INVENTION

An exemplary embodiment includes a pipelined processor including one or more units having storage locations not directly accessible by software instructions. The processor includes a load-store unit (LSU) in direct communication with the one or more units for accessing the storage locations in response to special instructions. The processor also includes a requesting unit for receiving a special instruction from a requester, the special instruction requesting data from one of the storage locations not directly accessible by software instructions. The requesting unit includes a mechanism for performing a method. The method includes broadcasting storage location information from the special instruction to one or more of the units to determine a corresponding unit having the storage location specified by the special instruction. Execution of the special instruction is initiated at the corresponding unit. If the unit executing the special instruction is not the LSU, the data is sent to the LSU. The data is received from the LSU as a result of the execution of the special instruction. The data is provided to the requester.

Another embodiment includes a pipelined process that includes one or units having storage locations not directly accessible by software instructions, a LSU in direct communication with the one or more units for accessing the storage locations in response to special instructions, an address generation (AGEN) unit in communication with the LSU via an address bus for operand access and via an LSU address override bus, and a requesting unit for receiving a special instruction from a requester. The requesting unit is in communication with the AGEN unit via an information bus, the special instruction requests data from one of the storage locations not directly accessible by software instructions, and the requesting unit includes a mechanism for implementing a method. The method includes broadcasting storage location information from the special instruction to one or more of the units to determine a corresponding unit having the storage location specified by the special instruction. Execution of the special instruction is initiated at the corresponding unit utilizing the register address bus for result write-back to specify the storage location. If the unit executing the special instruction is not the LSU, then the data is sent to the LSU. The data is received from the LSU as a result of the execution of the special instruction, the receiving is via the LSU address override bus and the address bus. The data is provided to the requester.

A further exemplary embodiment includes a method for obtaining data in a pipelined processor, the processor having one or more units having storage locations not directly accessible by software instructions and a LSU in communication with the one or more units for accessing the storage locations in response to special instructions. The method includes receiving a special instruction from a requester, the receiving at a requesting unit and the instruction requesting data at a storage location not directly accessible by software instructions. Storage location information is broadcast from the special instruction to one or more of the units to determine a corresponding unit having the storage location specified by the special instruction. Execution of the special instruction is initiated at the corresponding unit. If the unit executing the special instruction is not the LSU, then the data is sent to the LSU. Data is received from the LSU as a result of the execution of the special instruction and then the data is provided to the requestor.

BRIEF DESCRIPTION OF THE DRAWINGS

Referring now to the drawings wherein like elements are numbered alike in the several FIGURES:

FIG. 3 depicts the format of a read special pervasive register (RSPR) instruction that may be implemented by an exemplary embodiment of the present invention;

DETAILED DESCRIPTION OF EXEMPLARY EMBODIMENTS

Figure 1:
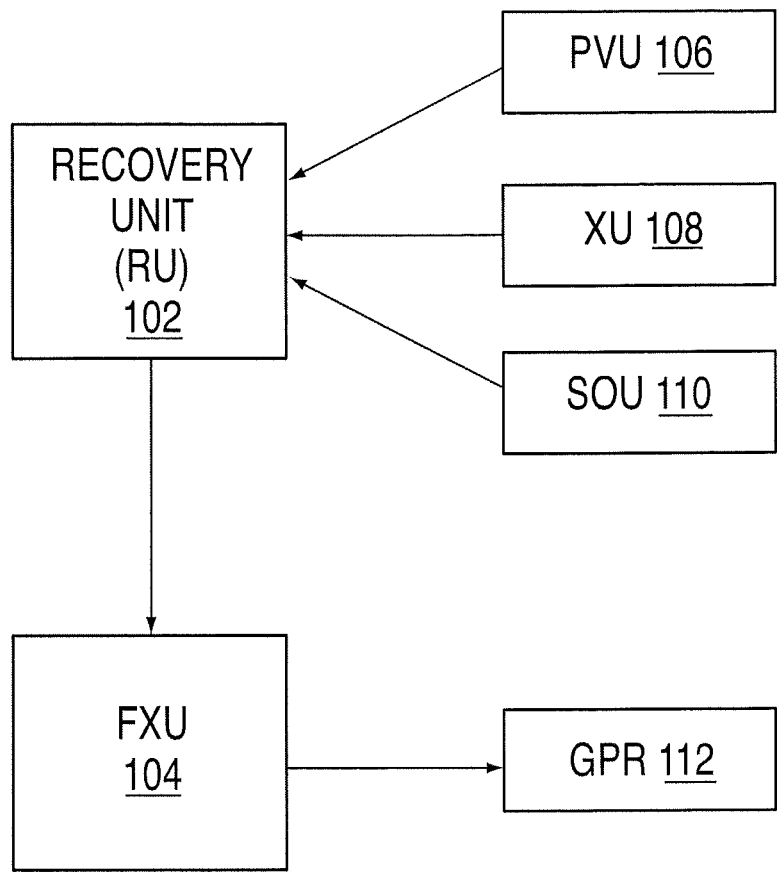
FIG. 1 is a block diagram of a pipelined processor.

An exemplary embodiment of the present invention provides a new instruction to millicode to be able to access predefined sets of registers distributed in potentially any units. The design makes use of buses that already exist for implementing a traditional instruction set (e.g., the IBM z/Architecture instruction set), and the design directly updates a general purpose register (GPR) with the value of the registers to be read. An exemplary embodiment of the present invention allows the results from a hardware address translator co-processor unit (XU) or pervasive units (PVUs) or a system operation unit (SOU) to be routed directly into a GPR. By merging their result data together into an address bus already existing from a load-store unit (LSU) into the address generation (AGEN) unit, and then into an existing information bus from the AGEN unit into a fixed point unit (FXU), the desired results can then be directly written into a GPR.

A typical microprocessor floorplan has the LSU in close proximity to the XU, SOU and, in many cases, the PVUs. The pre-merging of XU, SOU or PVU results into the LSU address flow, as described herein, allows physical wiring to be shorter and localized. In an exemplary embodiment, this design is generalized into reading data from registers that are anywhere in the microprocessor, and then optimally deciding how to route that data into the FXU (or any other unit that can write the GPR). The data bus wiring can thus be more flexible depending on the current processor design floorplan.

When the result is written into a GPR, instead of a system register, normal error recovery available in a modern processor handles errors occurring during operation without the need for extra hardware.

For a microprocessor that includes functions that are implemented by millicode, the use of GPRs, floating point registers, or storage provided in FXUs, floating point units, and LSUs are well understood. However, there exists a second group of units in a microprocessor that supply data required by the millicode to accomplish its tasks. This second group of units includes, but is not limited to, an XU, a PVU, and a SOU. "Normal" or "traditional" or simply "software" instructions are instructions that are directly available for use in software code (such as for operating systems or applications) and are described as part of a publicly available instruction set architecture (often referred to as "ISA") for a given microprocessor architecture. The instructions that access the data required by the millicode to accomplish its tasks may be referred to as "special instructions" or "millicode assist instructions" or simply "millicode instructions" because they access registers and storage locations that are not accessible using traditional software instructions. These special instructions are not in the ISA, are unique to millicode, and can only be used by millicode in a special microprocessor "millicode mode", and therefore are not part of software instructions.

In an exemplary embodiment, the millicode initiates operations in the XU and obtains results from the initiated operations. These operations include, but are not limited to, getting dynamic address translation results in certain modes for a specific address. Similarly, the millicode needs to access data retrieved from various pervasive operations in the PVU. These operations include, but are not limited to, obtaining hardware performance measurements or debug data. Millicode also initiates system operations, and inspects system operation results and status in the SOU. In general, the results of these operations are not accessible via traditional software instructions.

FIG. 1 depicts one method of accessing the storage locations not directly accessible via operating system software instructions. As depicted in FIG. 1, the result buses from the PVU 106, XU 108, and SOU 110 are sent directly into a recovery unit (RU) 102. The RU 102 updates its corresponding system registers depending on the results and provides a data path to the FXU 104 when the millicode requests a read of a specified RU 102 system register. Read interlocks are provided in the hardware so that millicode will read the desired latest result. One such approach is described in U.S. Pat. No. 6,671,793 to Swaney et al., of common assignment herewith and hereby incorporated by reference in its entirety. One disadvantage to this approach is that, due to the physical locations of the XU 108, PVU 106, or SOU 110, sending all of these results to the RU 102 may not be desirable, and could become a physical wiring congestion problem. Moreover, with a result being put first in a RU 102 provided system register, millicode always needs to read the system register into a GPR before it can operate on the desired result. This process adds more instruction path lengths and thus may not achieve optimal performance. Additional concerns are that error recovery may require special logic to ensure correct behavior if a microprocessor encounters an error and needs to perform a hardware retry.

Figure 2:
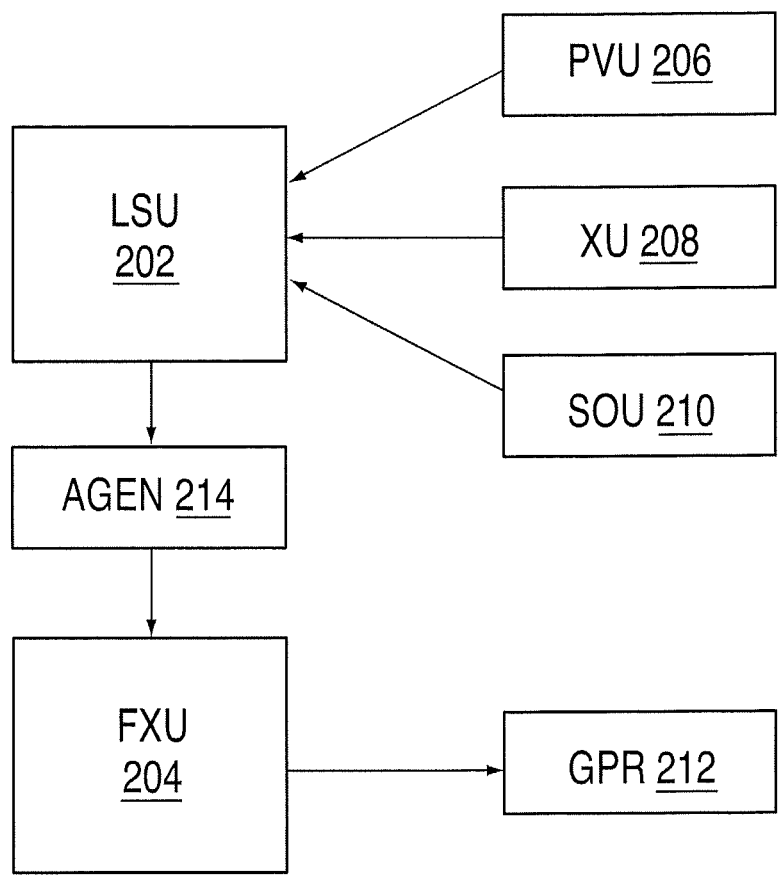
FIG. 2 is a block diagram of a pipelined processor that may be implemented by an exemplary embodiment of the present invention.

FIG. 2 depicts a processor that may be implemented in accordance with an exemplary embodiment of the present invention. The processor depicted in FIG. 2 is similar to the processor depicted in FIG. 1 in that it has millicode (e.g., a z/Series z900 processor from IBM), and a PVU 206, XU 208 and SOU 210. A difference is that the result buses from the PVU 206, XU 208, and SOU 210 are sent into a LSU 202 (and not into the RU 102) and then to an AGEN unit 214. The LSU 202 is utilized during normal system operation to retrieve data required for an instruction and to forward the retrieved data, via an AGEN unit 214, to a FXU 204 for use in executing the instruction. The contents of the requested register are input to the GPR 212 by the FXU 204.

Referring to FIG. 3, an exemplary embodiment of the present invention includes a new instruction, READ SPECIAL PERVASIVE REGISTER (RSPR), to read data from a pre-defined set of registers from storage locations inside the processor that are not directly accessible by traditional software instructions. The pre-defined set of registers may be in the RU 102 or in other units (e.g., the PVU 206, XU 208, SOU 210) within the microprocessor. The RSPR instruction has three input parameters: R1, REG, and RUI; and the RSPR instruction outputs the contents of register R1. An exemplary embodiment of the RSPR instruction is depicted in FIG. 3 and defined as follows:

---

R1 = Destination Millicode General Register (MGR) (decimal, hexadecimal, or absolute symbolic), specifies the register for storing the data returned by the instruction REG = Special Pervasive Register Number to read (decimal, hexadecimal, or absolute symbolic), specifies the pre-defined register to be read RUI = Use indirect pervasive address in MCR41.48:55 (or any other specified millicode control register), specifies the storage location to be read Form:
   RSPR R1, REG
   RSPR R1, REG, I
   RSPR R1,,I Checks:
   R1 is specified
   R1 is not greater than 15 (self defined values only)
   REG is not greater than X'FF' (self defined values only)
   RUI is I, 1, 0, or omitted
   REG is specified if RUI is 0 or omitted The special pervasive register (REG) is loaded into the 64-bit MGR specified by R1

Bit 17 of the instruction, when "1"b, specifies that MCR41.48:55 is to be used as the pervasive address instead of instruction bits 24:31

Bits 24:31 of the instruction specify the special pervasive address of the register to be read Bits 16, 18:23 of the instruction are not used The condition code is not changed by this instruction

---

In general, each register/storage location that needs to be accessible to millicode will have a unique read address. When a RSPR instruction is dispatched, the register read address will be sent to the units (e.g., the PVU 206) that contain such registers. These units will select the desired register, and then send the data to the LSU 202.

Figure 4:
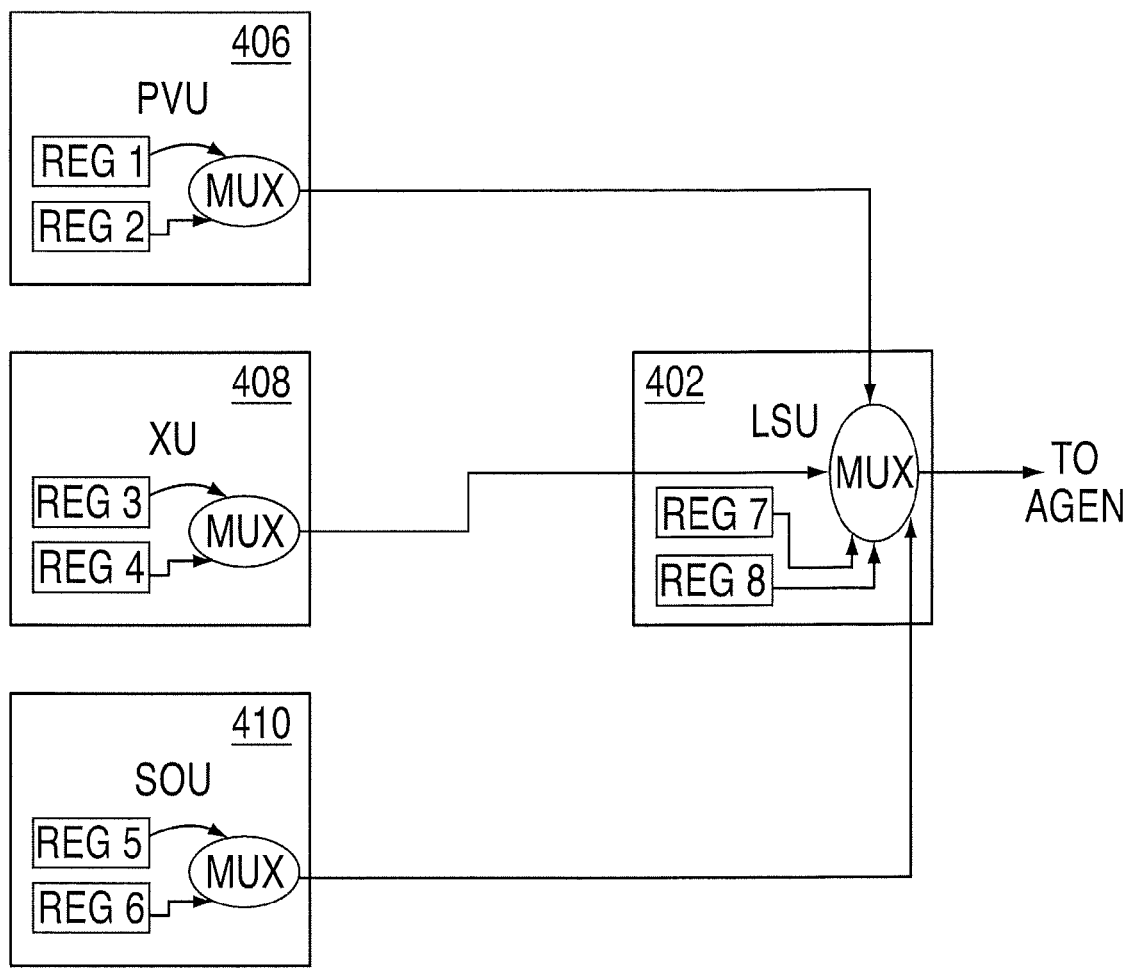
FIG. 4 is a block diagram of a system that may be implemented in accordance with an exemplary embodiment of the present invention.

FIG. 4 depicts a block diagram of an LSU 402, PVU 406, XU 408 and SOU 410 that may be implemented in accordance with an exemplary embodiment of the present invention. When a RSPR instruction is dispatched, the register read address is sent to the units that contain special pervasive registers (e.g., the PVU 406, XU 408, SOU 410). For example, a register in the PVU that can hold data output from the trace array may have a "special" register address of SPR20 (where 20 represents an 8-bit hex value of x'20'). The RSPR instruction to retrieve data from SPR20 would either have a REG value of x'20' (hex) with RUI of 0 or omitted, or it would have a RUI of 1, and MCR 41.48:55 would have a value of x'20' (hex). These units will select the desired register and then send the data into the LSU 402, or alternatively the desired register may already be contained inside the LSU 402. During the initial execution, the FXU 204 will be instructed to hold on to its actual execution by the LSU 202 similar to handling a cache miss situation. During this time, the LSU 202 will collect the data received from one of such units, including itself, by decoding the read address. Once the data is received, the LSU 202 will multiplex this data into its address bus to the AGEN unit 214 and it will signal to the AGEN unit 214 and FXU 204 that execution can be restarted and be executed. The AGEN unit 214 will route this address bus (now containing data) through its address flow and then pass the information to the FXU 204, which will write into the GPR 212.

Figure 5:
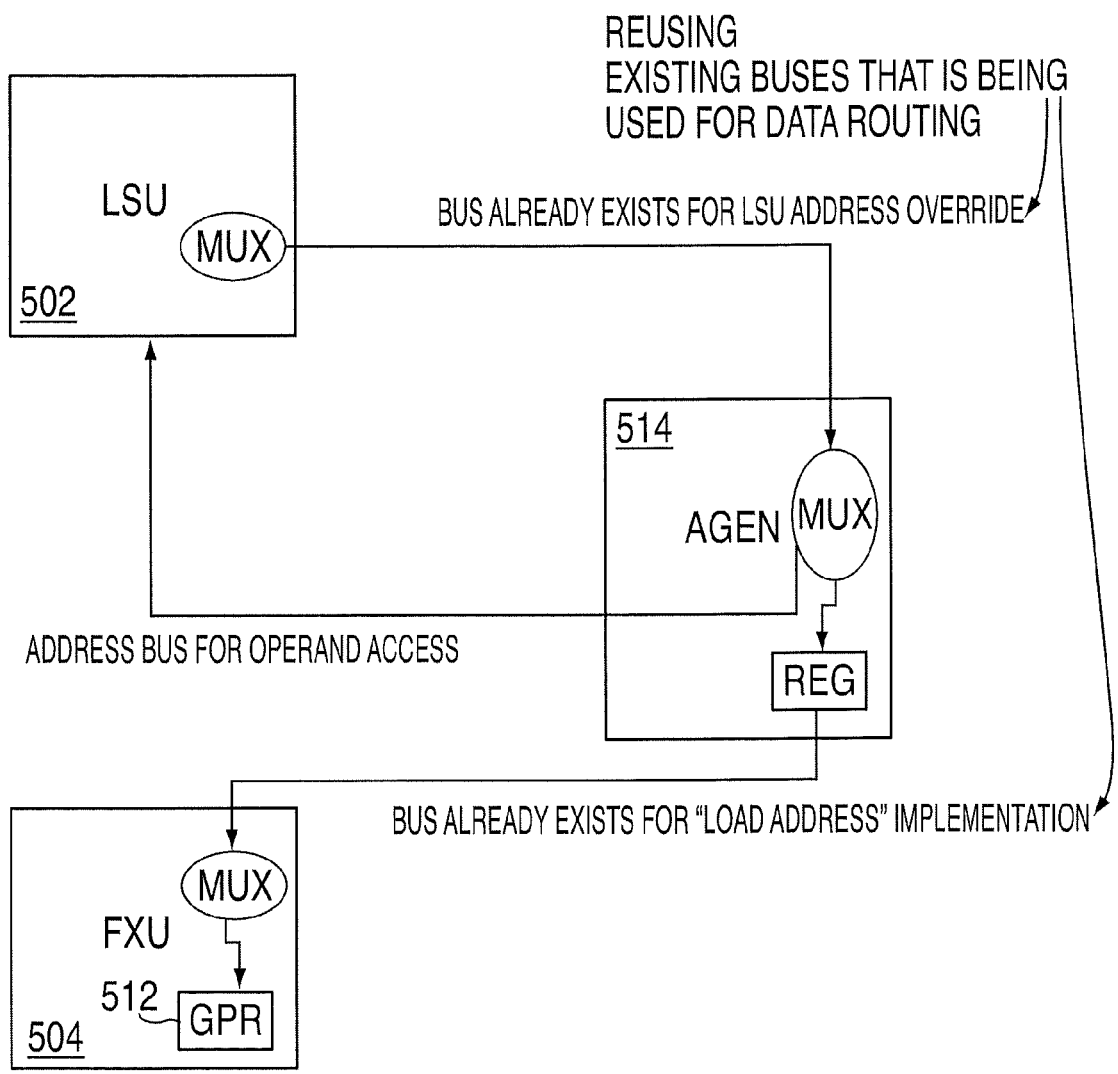
FIG. 5 is a block diagram of a system that may be implemented in accordance with an exemplary embodiment of the present invention.

An exemplary embodiment, such as that depicted in FIG. 5, utilizes existing busses and logic to access the data. Referring to FIG. 5, in a typical processor, the AGEN unit 514 sends the look-up address for operand fetches to the LSU 502 for reading data from its cache. It is also common that the LSU 502 will need to override the AGEN unit 514 address output with its own internal request like a cross interrogate. In an exemplary embodiment of the present invention, the RSPR data is multiplexed into the LSU's 502 address override bus to be sent to the AGEN unit 514. However, in this case, the LSU 502 is not overriding output from the AGEN unit 514 with an address, but it is actually sending result data into the AGEN unit 514. For microprocessors that implement instructions such as "Load Address" (e.g., IBM z/Architecture), it is also common to have the AGEN unit 514 pre-add the address and then send the adder result to the FXU 504 to be written into a GPR 512. In an exemplary embodiment of the present invention, during the execution of RSPR, after the LSU 502 sends the result through its address bus to the AGEN unit 514, the AGEN unit 514 will forward this data through its information bus into the FXU 504 which will write into the GPR 512. Basically, the RSPR is implemented by combining the concepts of pseudo cache miss, LSU address override, and Load Address implementation in one instruction to achieve the desired behavior.

To reuse the same concept, during a perform translator operations instructions (PXLO), the instruction will be initiated as if there is a cache miss. The translator will start performing the desired operation. Once the result is obtained, the data will be routed back to the LSU 502. The LSU 502 will restart the pipeline and forward the data to the AGEN unit 514 which will forward it to the FXI 504, similar to a RSPR instruction.

Technical effects and benefits include allowing physical wiring to be shorter and localized due to the pre-merging of XU, SOU or PVU results into the LSU address flow. In addition, because the result is written into a GPR, normal error recovery is available and errors during operation will be handled without extra hardware.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

IBM® is a registered trademark of International Business Machines Corporation, Armonk, N.Y., U.S.A. Other names used herein may be registered trademarks, trademarks or product names of International Business Machines Corporation or other companies.

The invention claimed is:

1. A pipelined computer processor configured to support a software architecture comprising a software instruction set available to an operating system and application programs, the processor further configured to execute special instructions not available to the operating system and application programs, comprising:
   a plurality of units, wherein the plurality of units comprises a pervasive unit (PVU), a hardware address translator co-processor unit (XU), and a system operation unit (SOU), each of the plurality of units comprising respective registers that are not defined by said software architecture and are not directly accessible by software instructions of the software architecture;
   a load-store unit (LSU) in direct communication with the plurality of units for accessing the registers based on execution of special instructions, wherein the LSU is not one of the plurality of units; and
   a fixed point unit (FXU) for receiving a special instruction from a requestor, the special instruction requesting data from one of the registers not directly accessible by software instructions, the pipelined computer processor configured for performing a method for executing the special instructions comprising:

broadcasting storage location information from the special instruction to plurality of units to determine a corresponding unit of the plurality of units having a register specified by the storage location information of the special instruction;

initiating execution of the special instruction at the corresponding unit;

sending the data from the register in the corresponding unit to the LSU;

receiving the data by the FXU from the LSU as a result of the execution of the special instruction; and providing the data from the FXU to the requestor.

2. The processor of claim 1 wherein the special instruction is a millicode instruction that is not part of an instruction set architecture (ISA) of the pipelined computer processor.

3. The processor of claim 1 wherein the corresponding unit is the PVU.

4. The processor of claim 1 wherein the corresponding unit is the XU.

5. The processor of claim 1 wherein the corresponding unit is the SOU.

6. The processor of claim 1 wherein the data is provided to the requestor via a general purpose register (GPR).

7. A pipelined computer processor configured to support a software architecture comprising a software instruction set available to an operating system and application programs, the processor further configured to execute special instructions not available to the operating system and application programs, comprising:

a plurality of units, wherein the plurality of units comprises a pervasive unit (PVU), a hardware address translator co-processor unit (XU), and a system operation unit (SOU), each of the plurality of units comprising respective registers that are not defined by said software architecture and are not directly accessible by software instructions of the software architecture;

a load-store unit (LSU) in direct communication with the plurality of units for accessing the registers based on execution of special instructions, wherein the LSU is not one of the plurality of units;

an address generation (AGEN) unit in communication with the LSU via an address bus for operand access and via an LSU address override bus; and a fixed point unit (FXU) for receiving a special instruction from a requestor, the requesting unit in communication with the AGEN unit via an information bus, the special instruction requesting data from one of the registers not directly accessible by software instructions, the pipelined computer processor configured for performing a method for executing the special instructions comprising:

broadcasting storage location information from the special instruction to the plurality of units to determine a corresponding unit of the plurality of units having a register specified by the storage location information of the special instruction;

initiating execution of the special instruction at the corresponding unit utilizing a register address bus for result write-back to specify the storage location;

sending the data from the register in the corresponding unit to the LSU;

receiving the data by the FXU from the LSU as a result of the execution of the special instruction; and providing the data from the FXU to the requestor.

8. The processor of claim 7 wherein the address bus for operand access is utilized by the operating system software instructions when a look-up address for operand fetches is sent to the LSU for reading data from a LSU cache.

9. The processor of claim 8 wherein the LSU address override bus is utilized by the software instructions when the LSU overrides the AGEN unit address output with its own internal request.

10. The processor of claim 8 wherein the information bus is utilized by the software instructions for sending to the FXU an address to be written into a GPR.

11. A method for obtaining data in a pipelined processor, the processor having a plurality of units having registers not directly accessible by software instructions, and a load-store unit (LSU) in communication with the plurality of units for accessing the registers in response to special instructions, wherein the LSU is not one of the plurality of units, the method comprising:

receiving a special instruction from a fixed point unit (FXU), the special instruction requesting data located at a register that is located in a corresponding unit of the plurality of units, wherein the plurality of units comprises a pervasive unit (PVU), a hardware address translator co-processor unit (XU), and a system operation unit (SOU), each of the plurality of units comprising respective registers that are not defined by said software architecture and that are not directly accessible by software instructions of a software architecture;

broadcasting storage location information from the special instruction to the plurality of units to determine the corresponding unit of the plurality of units having the register specified by the special instruction;

initiating execution of the special instruction at the corresponding unit;

sending the data from register in the corresponding unit to the LSU;

receiving the data from the LSU by the FXU as a result of the execution of the special instruction; and providing the data from the FXU to the requestor.

12. The method of claim 11 wherein the special instruction is a millicode instruction that is not part of an instruction set architecture (ISA) of the pipelined computer processor.

13. The method of claim 11 wherein the data is provided to the requestor via a general purpose register.

14. The processor of claim 2 wherein execution of the millicode instruction comprises a dynamic address translation by the XU.

* * * * *